United States Patent [19]

Yates et al.

[11] 4,283,378

[45] Aug. 11, 1981

[54] PRODUCTION OF HIGH SURFACE AREA CARBON BLACKS

[75] Inventors: Barrie J. Yates, Andover, Mass.; Ronald C. Hurst, Pampa, Tex.

[73] Assignee: Cabot Corporation, Boston, Mass.

[21] Appl. No.: 62,727

[22] Filed: Aug. 1, 1979

[51] Int. Cl.$^3$ .......................... C01B 31/02; C09C 1/48
[52] U.S. Cl. ...................................... 423/456; 423/450
[58] Field of Search ............... 423/449, 450, 456, 459, 423/455

[56] References Cited

U.S. PATENT DOCUMENTS

| | | | |
|---|---|---|---|
| 2,617,714 | 11/1952 | Arnold | 423/450 |
| 3,832,450 | 8/1974 | Wiggins | 423/456 |
| 3,952,087 | 4/1976 | Antonsen et al. | 423/450 |
| 4,101,639 | 7/1978 | Surovikin et al. | 423/449 |
| 4,105,750 | 8/1978 | Horn et al. | 423/456 |

FOREIGN PATENT DOCUMENTS 38-16109  8/1963  Japan ........................................ 423/450

*Primary Examiner*—O. R. Vertiz
*Assistant Examiner*—Gregory A. Heller
*Attorney, Agent, or Firm*—Jack Schuman; Lawrence A. Chaletsky; Barry R. Blaker

[57] ABSTRACT

This disclosure relates to an improved furnace process for producing carbon blacks by the incomplete combustion of hydrocarbonaceous feedstock wherein the resultant blacks have higher surface areas than the carbon blacks normally prepared from the feedstocks, as a result of which the blacks are particularly suitable for use in imparting conductivity properites to plastic materials and the like. This disclosure also relates to the production of a novel class of furnace blacks having excellent conductivity properites and which are characterized by high surface areas and low pH values.

6 Claims, No Drawings

PRODUCTION OF HIGH SURFACE AREA CARBON BLACKS

This invention relates to the production of furnace blacks having many important applications, such as fillers, reinforcing agents, pigments and the like. More particularly, the invention relates to a furnace process for producing carbon blacks having high surface areas which are especially useful as conductive carbon blacks. In general, the process for preparing the blacks is a furnace process wherein a hydrocarbon feedstock is cracked and/or incompletely combusted in an enclosed conversion zone at temperatures above 1800° F. to produce carbon black. The carbon black entrained in the gases emanating from the conversion zone is then cooled and collected by any suitable means conventionally used in the art.

Accordingly, it is a primary object of this invention to provide a novel and improved process for the production of carbon blacks having surface areas higher than those produced by the process of this invention in the absence of the improvement.

A further object of this invention is to provide an improved furnace process for producing highly conductive carbon blacks.

It is another object of the present invention to provide a class of novel carbon blacks which are highly suited to impart conductive properties to polymer systems.

Other and different objects, advantages and features of the present invention will become apparent to those skilled in the art upon consideration of the following detailed description and claims.

In accordance with this invention, it has been found that the above and still further objects are achieved by modifying a modular or staged process for producing carbon black as, for example, disclosed and claimed in U.S. Pat. No. Re. 28,974. Such a staged process consists of an initially prepared primary combustion zone wherein a stream of hot gaseous combustion products is formed; a second or transition zone wherein liquid hydrocarbon feedstock in the form of solid streams or coherent jets is injected substantially transversely into the gaseous combustion stream; and a third zone which is the reaction zone where the carbon black is formed prior to termination of the reaction by quenching. The modification of the staged process entails adding water, in the form of water vapor and in an amount of from about 4 to 15 percent by volume based on the total gaseous volume of the fuel and oxidants utilized in preparing the primary combustion, into the primary combustion zone such that the water vapor is well mixed with the gaseous combustion products prior to the introduction of feedstock. In a preferred embodiment of the present invention, the water is added in an amount of from about 4.6 to about 11 percent by volume and in a particularly preferred embodiment, in an amount of from about 9 to about 11 percent by volume. The water may be introduced directly into the gaseous combustion products by any suitable means or, preferably, be introduced with the oxidant utilized in preparing the primary combustion. In any event, as noted hereinabove, it is essential that the water vapor be well mixed with the combustion products before the feedstock is introduced. It is also necessary for the production of the high surface area blacks that the residence time in the reactor be at least 0.5 second, and preferably at least 1.0 second, and that the overall percent combustion for the process ranges from about 40 to about 60 percent with the preferred range being from about 46 to about 57 percent.

Following the quenching of the reaction, the carbon black is collected in any of the conventional manners well known in the industry such as, for example, by bag filters alone or by utilizing cyclones together with bag filters. The collected black is then pelletized in the conventional manner and processed under oxidizing conditions. At this point, the novel furnace process will yield carbon blacks having markedly higher surface areas and capable of imparting conductivity properties. It has, however, been further discovered that subjecting the pellets of carbon black produced by the present process to processing under varying oxidizing conditions can also result in the production of high surface area blacks having controlled pH values, and in particular controlled so as to be below a value of 5. The novel class of high surface area furnace blacks are characterized by having an iodine surface area of at least 600 $m^2/g$, a pH value of less than 5, and a DBP value of at least 160 cc/100 g. In preferred embodiments, the novel blacks are characterized by having an iodine surface area ranging from about 800 $m^2/g$ to about 1100 $m^2/g$ and higher. Also, the preferred carbon blacks have a pH ranging from about 2 to about 4 with the most preferred being in the range of about 3 to about 4. With respect to structure level, the preferred DBP values are from about 180 to about 350, and higher, with the most preferred ranging from about 180 to about 275 cc/100 g.

In practicing the present process for producing high surface area blacks, the following operation is observed. A carbon black-yielding liquid hydrocarbon feedstock is injected substantially transversely into a pre-formed stream of hot combustion gases flowing in a downstream direction at an average linear velocity of at least 500 feet per second. The feedstock is injected transversely in the form of coherent jets into the combustion gases from the periphery of the stream to a degree sufficient to achieve penetration and thereby avoid coke formation on the walls of the carbon forming zone of the reactor. In this instance, however, the feedstock will have been injected into a preformed stream of gaseous combustion products containing added water vapor thoroughly mixed therewith. The amount of added water, as stated earlier, is critical to the successful operation of the present process, and this feature together with the other indicated operations, including requisite overall percent combustion ranges and definite residence times are directly related to the production of the unusually high surface area furnace blacks.

In the preparation of the hot combustion gases employed in preparing the blacks of the present invention, there are reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane butane, and pentane fractions, fuel oils and the like. As referred to herein, the primary combustion represents the amount of oxidant used in the first stage of the modular process relative to the amount of oxidant theoretically required for the complete combustion of the first stage hydrocarbon to form carbon dioxide and water. In the present process, the primary combustion may range from about 85 to about 300 percent combustion, with the preferred primary or first stage combustion ranging from about 85 to about 150 percent combustion. In this manner there is generated a stream of hot combustion gases flowing at a high linear velocity. It has furthermore been found that a pressure differential between the combustion chamber and the reaction chamber of at least 1.0 p.s.i. (6.9 kPa), and preferably of about 1.5 (10.3 kPa) to 10 (69 kPa) p.s.i., is desirable. Under these conditions, there is produced a stream of gaseous combustion products possessing sufficient energy to convert a carbon black-yielding liquid hydrocarbonaceous feedstock to the desired carbon black products. The resultant combustion gas stream emanating from the primary combustion zone attains a temperature of at least about 2400° F. (1316° C.), with the most preferable temperatures being at least above about 3000° F. (1649° C.). The hot combustion gases are propelled in a downstream direction at a high linear velocity which is accelerated by introducing the combustion gases into an enclosed transition stage of smaller diameter which may, if desired, be tapered or restricted such as by means of a conventional venturi throat. It is at this point in the process, which is regarded as the second stage, where the feedstock is forcefully injected into the stream of hot combustion gases.

More particularly, in the second stage where the combustion gases are traveling at high velocity and there exists a gas kinetic head of at least above 1.0 p.s.i (6.9 kPa), a suitable liquid carbon black-yielding hydrocarbon feedstock is injected into the combustion gases, under sufficient pressure to achieved desired penetration thereby insuring a high rate of mixing and shearing of the hot combustion gases and the liquid hydrocarbon feedstock. As a result of this environment, the liquid hydrocarbon feedstock is rapidly decomposed and converted to carbon black in high yields. Suitable for use herein as hydrocarbon feedstocks which are readily volatilizable under the conditions of the reaction are unsaturated hydrocarbons such as acetylene; olefins such as ethylene, propylene butylene; aromatics such as benzene, toluene and xylene; certain saturated hydrocarbons; and volatilized hydrocarbons such as kerosenes, naphthalenes, terpenes, ethylene tars, aromatic cycle stocks and the like. The liquid feedstock is injected substantially transversely from the outer or inner periphery, or both, of the stream of hot combustion gases in the form of a plurality of small coherent jets which penetrate well into the interior regions or core of the stream of combustion gases but not to a depth such that opposing jets would impinge. In practicing this invention, the hydrocarbon feedstock may readily be introduced as coherent streams of liquid by forcing the liquid feedstock through a plurality of orifices having a diameter ranging from 0.01 (0.25 mm) to 0.15 (3.81 mm) inch, and preferably ranging from 0.02 (0.51 mm) to 0.06 (1.52 mm) inch under an injection pressure sufficient to achieve the desired penetration.

The amount of feedstock utilized and/or the amounts of fuel and/or oxidant employed herein will be adjusted so as to result in an overall percent combustion of from about 40 to about 60 percent and preferably from about 46 to about 57 percent. The overall combustion represents the total amount of oxygen used in the carbon forming process relative to the amount of oxygen required for the complete combustion of the total amount of hydrocarbon used in the carbon forming process so as to yield carbon dioxide and water. The overall combustion is usually expressed as a percentage.

The third stage of the modular process involves the provision of a reaction zone which will permit sufficient residence time for the carbon black forming reaction to occur prior to termination of the reaction by quenching. In general, although the residence time in each instance depends upon the particular conditions and the particular black desired, the residence times of the present process are at least 0.5 second, and preferably at least 1.0 second. Accordingly, once the carbon black forming reaction has proceeded for the desired period of time, the reaction is terminated by spraying thereon a quench liquid, such as water, using at least one set of spray nozzles. The hot effluent gases containing the carbon black products suspended therein are then passed downstream where the steps of cooling, separating and collecting the carbon black are carried out in conventional manner. For example, the separation of the carbon black from the gas stream is readily accomplished by conventional means such as a precipitator, cyclone separator, bag filter, or combinations thereof.

As mentioned hereinbefore, the practice of the above-described process will result in the production of furnace blacks having high surface areas and excellent conductivity properties when water, in the form of vapor, is included as an essential operation of the process. More particularly, it is not merely the addition of water to the process that results in the production of the high surface areas of the blacks, but rather, the manner of introducing the water, the amount of water and the form in which the water is introduced. All of these features are necessary for the proper operation of the present process. In more detail, the added water, which may be in any physical form at the time of addition, must, however, be in the form of water vapor within the stream of gaseous combustion products prior to the introduction of the liquid feedstock. Furthermore, the added water must be introduced under conditions such that the water is well mixed with the combustion gas stream prior to the introduction of the liquid hydrocarbon feedstock. Moreover, the amount of added water in the form of vapor found to be critical for the successful operation of the process ranges from about 4 to 15 percent by volume based on the total gaseous volume of the fuel and oxidant utilized in preparing the primary combustion, with a preferred amount ranging from about 4.6 to about 11 percent and a particularly preferred range being from about 9 to about 11 percent by volume.

The following testing procedures are used in evaluating the analytical and physical properties of the blacks produced by the present invention.

IODINE SURFACE AREA

The iodine surface area of a carbon black is determined in accordance with the following procedure and reported in units of square meters per gram ($m^2/g$). A carbon black sample is placed into a size 0 porcelain crucible equipped with a loose-fitting cover to permit escape of gases and is devolatilized or calcined at a temperature of 1700° F. (927° C.) over a period of 7 minutes. The crucible and contents are then cooled in a dessicator, following which the top layer of calcined carbon black to a depth of about one-fourth inch is removed and discarded. From the carbon black remaining in the crucible a convenient sample is weighed, accurate to within 0.1 milligram (mg) and then transferred into a four ounce oil sample bottle. It has been found that for carbon blacks expected to have surface areas in the range of 300 to 750 m²/g an appropriate sample size is 0.1 gram whereas for blacks having surface areas in excess of 750 m²/g, an appropriate sample size is 0.05 gram. To the bottle containing the carbon black sample there is added 40 milliliters (ml) of 0.0473 N iodine solution. The bottle is covered and the contents are then shaken for ten minutes at a rate of 120 to 260 back and forth trips per minute. The resulting solution is immediately centrifuged at a rate of 1200 to 2000 revolutions per minute (rpm) until the solution becomes clear, this usually covering a period of 1 to 3 minutes. Immediately after centrifuging, a 25 ml aliquot of the iodine solution, to which has been added a few drops of 1% starch solution as an end point indicator, is titrated with 0.0394 N sodium thiosulfate solution until one drop of the sodium thiosulfate solution causes the blue color to become colorless. As a blank, 40 ml of the 0.0473 N iodine solution is shaken, centrifuged and titrated in the same manner as above for the black-containing solution. The iodine surface area, expressed in m²/g, is calculated in accordance with the formula:

$$S.A. = 10(B-T) - 4.57/1.3375$$

Wherein B is the titration of the blank and T is the titration of the sample.

DIBUTYL PHTHALATE (DBP) ABSORPTION NUMBER

The DBP absorption number of a carbon black, in pelleted form, is determined in accordance with ASTM Test Method D 2414-76.

TINT STRENGTH

The tint strength of a carbon black sample is determined relative to an industry tint reference black in accordance with ASTM D 3265-76a.

PH VALUE OF CARBON BLACK

Into a suitable Erlenmeyer flask there are placed a 5 gram sample of pelleted carbon black and 50 ml of distilled water. The carbon black-containing water mixture is brought to a boiling point using an electric hot plate, and maintained at a slow boil for a period of 10 minutes but not such as to cause dryness to occur. The resulting mixture is cooled to room temperature and the pH thereof is then determined utilizing a pH meter equipped with glass and calomel electrodes having an accuracy of ±0.05 pH units. Prior to determining the pH of the carbon black, the pH meter is calibrated against two buffer solutions, one having a pH of 4.0 and the other having a pH of 7.0.

In order to evaluate the performance characteristics of the blacks in imparting compound moisture absorption and volume resistivity properties, the blacks are compounded with a suitable resin, such as, ethylene/ethyl acrylate copolymer in the present instance. The compound to be tested is prepared by incorporating the desired amount of black into the resin, on a weight basis. For example, compounds containing carbon black in amounts of 12% by weight, 20% by weight and 36% by weight are commonly preferred for such evaluations.

The procedure for preparing the resin/black compounds involves adding one-half of the ethylene/ethyl acrylate resin to be used into a Banbury mixer, followed by the total amount of carbon black and then the remainder of the resin. The temperature of the Banbury mixer is brought to 100° F. (37.8° C.) and the mixing is commenced. The initial mixing is carried out for 30 seconds at 77 rpm (No. 1 speed) under a ram pressure of 40 p.s.i. (0.276 M Pa). Thereafter, the speed is increased to 115 rpm (No. 2 speed) for a period of 45 seconds. During this cycle the temperature reaches 100° F. (37.8° C.) whereupon the ram is raised to permit the black to be brushed back into the hopper. When the temperature reaches 250° F. (121° C.), water is circulated through the mixer housing and rotors. Following the period of mixing at 115 rpm, the speed is increased to 230 rpm (No. 3 speed) for an additional 105 seconds. At the end of this period of time, the mixing is stopped and the resin/black compound is removed from the mixer. In the case of a compound containing 12 or 20% by weight loading of the black, the temperature of the compound is from 260° F. (127° C.) to 290° F. (143° C.). Whereas for a 36% loading of black the compound temperature is from 330° F. (166° C.) to 360° F. (182° C.). The resulting compound is then passed twice through a cold two-roll mill and formed into sheets for the subsequent testing.

COMPOUND MOISTURE ABSORPTION

Sheets of the various ethylene/ethyl acrylate compounds prepared in the Banbury mixer as described above were subjected to dicing and granulating to yield suitable test samples. A two gram sample of the granulated compound is weighed into a glass crucible of known weight and dried overnight at 190° F. (87.8° C.) to remove any moisture in the compound. After cooling in a desiccator, the weight is obtained to the nearest one-tenth of a milligram. The compound is then placed into a desiccator maintained at conditions of room temperature and 79% relative humidity. The compound is then weighed after 1 hour and periodically thereafter for 3 days and further, if needed, until constant weight is achieved. The equilibrium moisture absorption is calculated as a weight percentage of the compound.

VOLUME RESISTIVITY

This test procedure is employed for determining the volume resistivity of plastic compounds containing carbon black. The following is a description of the preparation from the sheeted compounds prepared in the Banbury mixer as described earlier of the compression molded plaques to be used as test specimens. From the sheeted compound prepared on the two-roll mill there are cut 7×7 inch (17.8×17.8 cm) samples. A compression mold with a cavity of 7×7 inch (17.8×17.8 cm) in size then lined with a release layer of polyethylene terephthalate film onto which is placed the test specimen. As a top release covering there is provided a film of polytetrafluoroethylene film. The covered compression mold is placed in a compression press which is maintained at a temperature of 320° F. (160° C.), as for example, by introducing steam at a pressure of 100 p.s.i. (0.689 MPa). When the compression mold reaches a temperature of 320° F. (160° C.), the ram force of the compression press is raised from zero to a reading of 20 tons (18,144 kg) and is so maintained for a period of 5 minutes. The pressure on the sample is approximately 816 p.s.i. (5.63 MPa). The compression mold is then removed from the hot compression press and placed into a cold compression press, also maintained at 20 tons (18,144 kg) ram force, until the molds are cooled to about room temperature. The compression molded plaque of 7×7 inch (17.8×17.8 cm) size is then removed from the mold and deflashed.

To now prepare the actual specimen for the volume resistivity test procedure, a specimen of 2×6 inch (5.1×15.2 cm) size is cut from the 7×7 inch (17.8×17.8 cm) compression molded plaque. The test specimen is then coated on each end with a silver paint (silver conductive coating in ethyl alcohol) to produce an approximately one-half inch wide silver electrode. After drying, the uncoated portion of the specimen is measured to determine the exact distance between the electrodes, the average width and the average thickness. The specimen is then placed between 8×6 inch (20.3×15.2 cm) glass plates arranged crosswise to each other such that the edge of the top plate is evenly lined with the edge of the specimen. Brass shims are then placed on the top and bottom of each of the coated ends of the specimen. To the brass shims there are then attached alligator clips which lead to a Digitac Model H102120 Multimeter instrument for resistance measurements.

The resistance of the specimen is first measured into an oven maintained at 90° C. in order to obtain a resistance measurement at this temperature. In so doing, the resistance is initially measured after 3 minutes at 90° C. with subsequent readings being taken at 2 minute intervals for the next 30 minutes. After 30 minutes, readings are taken every 5 minutes until the specimen has been in the 90° C. oven for a total of 60 minutes. The value for the resistance of the specimen at 90° C. is fixed on a plot as the point where the readings become constant. The resistance measurements are then used in calculating the volume resistivity of the specimen by means of the following formula:

Volume Resistivity, ohms-cm = R × A/L

Wherein R is the resistance of the specimen (ohms),
A is the cross-sectional area of the uncoated portion of the specimen (cm$_2$), and
L is the distance between the two silver electrodes coated on each end of the specimen (cm).

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

Furthermore, as noted hereinbefore, there is a wide possibility of available materials from which to select a suitable liquid feedstock and fuel for combustion. However, in all of the examples herein, the same liquid feedstock and fuel were utilized. This in no way is intended to be limiting upon the materials that may be employed. As the liquid hydrocarbon feedstock there is used in the examples Sunray DX which is a fuel having by weight a carbon content of 90.4%, a hydrogen content of 7.56%, a sulfur content of 1.5%, an asphaltenes content of 4.4%, an ash content of 0.049%, a hydrogen to carbon ratio of 0.995, a sodium content of 2.8 ppm, a potassium content of 0.73 ppm. a B.M.C.I. of 135, a specific gravity in accordance with ASTM D 287 of 1.10, an API gravity of −3.1, an SSU viscosity (ASTM D 88) at 130° F. of 542.9, and an SSU viscosity at 210° F. of 63.3. The natural gas used as the fuel in all of the examples herein substantially comprises, by mole percent, 9.85% nitrogen, 0.18% carbon dioxide, 86.68% methane, 3.07% ethane, 0.19% propane, 0.01% isobutane, and 0.2% n-butane.

EXAMPLE 1

In this example there is employed a suitable reaction apparatus provided with means for supplying combustion gas-producing reactants, i.e., a fuel and an oxidant, either as separate streams or as precombusted gaseous reaction products to the primary combustion zone, and also means for supplying both the carbon black-yielding hydrocarboneous feedstock, the combustion gases to be introduced downstream to the apparatus, means for introducing the additional amounts of water, etcetera. The apparatus may be constructed of any suitable material such as metal and either provided with refractory insulation or surrounded by cooling means such as a recirculating liquid which is preferably water. Additionally, the reaction apparatus is equipped with temperature and pressure recording means, means for quenching the carbon black-forming reactions such as spray nozzles, means for cooling the carbon black product and means for separating and recovering the carbon black from other undesired by-products.

In a more detailed description of the apparatus utilized herein, the first stage is employed so as to obtain a substantially completely pre-formed combustion prior to feedstock injection. As a suitable burner there is provided an enclosed reaction vessel having a diameter of 8.75 inches (0.22 m) for a length of 40.75 inches (1.035 m) which is then reduced conically over the next 12 inches (0.305 m) to a diameter of 5.3 inches (0.135 m). Connected to the first zone, or burner section, is a second zone referred to as the transition zone having a diameter of 5.3 inches (0.135 m) and a length of 9 inches. It is in this zone that the liquid feedstock is injected as coherent streams through as many orifices as desired. The feedstock is injected under conditions sufficient to assure a proper degree of penetration into the combustion gas stream thereby avoiding problems of coke formation in the reactor. The resultant hot gas stream then enters a third zone, referred to as the reaction zone where the carbon black is formed. This zone extends to the point where the reaction is quenched. In the present case the reaction zone consists of a section having a diameter of 36 inches (0.914 m) and a length of 24 feet (7.32 m) followed by a section having a diameter of 27 inches (0.69 m) and a length of 11 feet (3.35 m).

Accordingly, in carrying out the present example, a first stage combustion of 140% is obtained by charging into the burner air preheated to 750° F. (399° C.) at a rate of 60,100 s.c.f.h. (0.447 m$^3$/s) and natural gas at a rate of 4930 s.c.f.h. (0.0367 m$^3$/s) under a pressure of 15 p.s.i.g. (0.103 MPa). The chamber pressure, or burner pressure, is recorded as 2.6 inches (8.8 kPa) of mercury. This results in a stream of hot combustion gases flowing in a downstream direction at a high linear velocity into the transition zone where the feedstock preheated to 400° F. (204° C.) is injected substantially transversely into the combustion gas stream at a rate of 54 gallons per hour (gph) (0.062 kg/s) under a pressure of 197 p.s.i.g. (1.36 MPa). The feedstock is injected through four unobstructed openings each of which has a size of 0.029 inch (0.74 mm) and are located peripherally to the stream of combustion gases. The gaseous stream then enters the reaction zone where, after a residence of 1.3 seconds, the stream is water-quenched to a temperature of 1370° F. (743° C.). The overall percent combustion of the reaction is 46.8%. The analytical and physical properties of this black are reported in Table I wherein this black is utilized as a control for Examples 2 and 3.

EXAMPLE 2

The procedure of Example 1 is followed utilizing the apparatus described therein with several variations which do not prevent drawing a comparison. Specifically, the combustion air, preheated to 750° F. (399° C.), is fed into the combustion chamber at a rate of 60,100 s.c.f.h. (0.477 m$^3$/s) and natural gas is introduced at a rate of 4930 s.c.f.h. (0.067 m$^3$/s) under a pressure of 16 p.s.i.g. (0.110 MPa). In this instance, together with the combustion air, there is fed into the burner water at a rate of 20 gph (or 3510 s.c.f.h.) (0.0261 m$^3$/s) which corresponds to 5.4% by volume based on the total gaseous volume of the air and gas utilized in preparing the primary combustion. As a result of bringing the water into the combustion chamber with the air, the water is well mixed with the stream of combustion gases prior to feedstock injection. Under these conditions, the primary combustion is 138.3% and the pressure in the combustion chamber is 2.8 inches (9.4 kPa) of mercury. Into the gaseous combustion stream containing the intermixed water vapor there is then added the coherent jets of liquid feedstock, preheated to 395° F. (202° C.), at a rate of 55 gph (0.063 kg/s) and under a pressure of 195 p.s.i.g. (1.35 MPa). The residence time of the reactor is 1.3 seconds and the reaction gases are water-quenched to 1340° F. (727° C.). The overall percent combustion of the run is 46.5%. The black is recovered in the normal manner and the analytical and physical properties thereof are reported in Table I.

EXAMPLE 3

The procedure of Examples 1 and 2 is followed, using the same apparatus, again with several differences in operating conditions. Here, gas is fed at a rate of 4920 s.c.f.h. (0.0366 m$^3$/s) under a pressure of 15 p.s.i.g. (0.103 MPa) while the combustion air, preheated to 740° F. (393° C.), is fed into the burner at a rate of 60,100 s.c.f.h. (0.447 m$^3$/s) containing water previously introduced thereinto at a rate of 40 gph (7020 s.c.f.h.) which is calculated to be 10.8% by volume based on the total gaseous volume of the gas and air. These conditions result in the pressure of the combustion chamber being 2.9 inches (9.8 kPa) of mercury and a primary combustion of 138.5%. Feedstock, preheated to 387° F. (197° C.), is injected through the four unobstructed openings at a rate of 55 gph (0.063 kg/s) and under a pressure of 191 p.s.i.g. (1.32 MPa). The residence time in the reactor is 1.3 seconds following which the carbon forming reaction is water-quenched to a temperature of 1450° F. (788° C.). The overall percent combustion of the reaction is 46.6%. Recovery of the black is carried out in the conventional way. Analytical and physical properties of this black are reported in Table I.

TABLE I

| Carbon Black | Example 1 | Example 2 | Example 3 |
| --- | --- | --- | --- |
| Water added, Vol. % | 0 | 5.4 | 10.8 |
| Iodine Surface Area, m$_2$/g | 531 | 566 | 630 |
| pH | 7.2 | 8.1 | 8.4 |
| DBP, cc/100g | 188 | 186 | 198 |
| Tint Strength, % | 129 | 131 | 139 |
| Ethylene/Ethyl Acrylate Resin containing 12% by weight loading of black | | | |
| Volume Resistivity, room temp. ohm-cm | 623 | 537 | 236 |
| Volume Resistivity, 90° C. ohm-cm | 5021 | 3601 | 892 |
| Compound Moisture Absorption, % | 1.01 | 1.28 | 1.45 |

The next two examples, numbers 4 and 5, are included herein to demonstrate that the present invention does not affect the well-known technique of increasing the overall percent combustion of a carbon black-forming reaction in order to produce blacks having higher surface areas. In other words, it has already been shown by Examples 1–3 that, all other conditions being essentially similar, the addition of water in accordance with the teachings herein will result in the production of blacks having higher surface areas. Therefore, since it is well-known to increase the surface area of blacks by raising the overall percent combustion, Examples 4 and 5 demonstrate that even further increases in surface area of the blacks are achieved when the technique of the present invention is combined with a well-known technique. This is clearly illustrated by comparing Example 3 with Examples 4 and 5 wherein the overall percent combustion is raised from 46.6% to 49.9% and 56.5% respectively, all else being substantially similar, especially the amount of added water, namely, 10.8% by volume and the primary combustion of about 138%.

EXAMPLE 4

The procedure and apparatus of Examples 1–3 are utilized except as shown hereinafter. Combustion air, preheated to 760° F. (404° C.), is introduced into the combustion chamber at a rate of 60,100 s.c.f.h. (0.447 m$^3$/s) and gas is introduced at a rate of 4910 s.c.f.h. (0.0365 m$^3$/s) under a pressure of 15 p.s.i.g. (0.103 MPa). In this case, the amount of added water brought in with the combustion air is the same as that of Example 3, namely, 40 gph (7020 s.c.f.h.) (0.0522 m$^3$/s) or 10.8% by volume. Under these conditions, the pressure in the combustion zone or chamber is recorded as 2.6 inches (8.8 kPa) of mercury and the primary combustion is determined to be 138.8%. The liquid feedstock, preheated to 390° F. (199° C.) is then injected through the four openings, each of 0.029 inch (0.74 mm) in in the form of solid streams at a rate of 49 gph (0.057 kg/s) and under a pressure of 162 p.s.i.g. (1.12 MPa). The residence time is 1.3 seconds prior to quenching the hot gases with water to a temperature of 1400° F. (760° C.). The overall percent combustion of the reaction is 49.9%. The black is recovered in the normal fashion and the analytical and physical properties of the black are reported in Table II.

EXAMPLE 5

The apparatus and procedure of Examples 1–4 is followed with several variations. Natural gas is introduced into the combustion zone at a rate of 4930 s.c.f.h. (0.0367 m$^3$/s) under a pressure of 16 p.s.i.g. (0.110 MPa). The combustion air, preheated to 750° F. (399°

C.), is fed in at a rate of 60,100 s.c.f.h. (0.447 m³/s) containing the same amount of added water as in Examples 3 and 4, namely, 40 gph (7020 s.c.f.h.) (0.0522 m³/s) or 10.8% by volume. The combustion chamber pressure is recorded as 2.5 inches (8.4 kPA) of mercury and the primary combustion is 138.4%. Into the combustion gas stream there is then injected the liquid feedstock, preheated to 340° F. (171° C.), at a rate of 40 gph (0.046 kg/s) and under a pressure of 152 p.s.i.g. (1.05 MPa). The reaction is water-quenched to a temperature of 1400° F. (760° C.) after a residence time of 1.2 seconds. The black is collected and recovered in the normal fashion. The overall percent combustion of this reaction is 56.5%. The analytical and physical properties of the black of this example are reported in Table II.

TABLE II

| Carbon Black | Example 3 | Example 4 | Example 5 |
|---|---|---|---|
| Water added, Vol. % | 10.8 | 10.8 | 10.8 |
| Overall Combustion, % | 46.6 | 49.9 | 56.5 |
| Iodine Surface Area, m$_2$/g | 630 | 673 | 846 |
| pH | 8.4 | 8.3 | 8.3 |
| DBP, cc/100g | 198 | 219 | 240 |
| Tint Strength, % | 139 | 143 | 140 |
| Ethylene/Ethyl Acrylate Resin containing a 12% by weight loading of black | | | |
| Volume Resistivity, Room Temp., ohm-cm | 236 | 59 | — |
| Volume Resistivity, 90° C., ohm-cm | 892 | 162 | — |
| Compound Moisture Absorption, % | 1.45 | 1.05 | — |

The data reported in Table II clearly show that the process of the present invention which results in increased surface area of the blacks can be enhanced when combined with an increased overall percent combustion.

The remaining examples show the flexibility of the present process to prepare the novel furnace blacks which have very high surface areas and pH values below 5 and yet are extremely suitable for use as conductive blacks.

EXAMPLE 6

In this example the apparatus is somewhat similar to that used in Examples 1-5 in that the transition zone is of the same dimensions but for the presence of 4 unobstructed orifices having a size of 0.038 inch (0.97 mm) rather than 0.029 inch (0.74 mm). Furthermore, while conceptually similar, the dimensions of the first stage of the apparatus used herein differ in that the enclosed reaction vessel has a diameter of 8.4 inches (0.213 m) for a length of 26.6 inches (0.676 m) before necking down in a conical manner to a diameter of 5.3 inches (0.0135 m) over a distance of 5.3 inches (0.0135 m). In this instance, the third zone or the zone in which the carbon forming is completed has a diameter of 36 inches (0.914 m) and a length of 16 feet (4.88 m). Other than this, the remainder of the equipment is as shown previously herein. Accordingly, in carrying out the present example combustion air, preheated to 710° F. (377° C.), is fed into the combustion zone at a rate of 70,700 s.c.f.h. (0.526% m³/s) and the natural gas at a rate of 6540 s.c.f.h. (0.0487 m³/s) under a pressure of 26 p.s.i.g. (0.179 MPa). Added water is brought into the reactor with the combustion air in an amount of 35 gph (6140 s.c.f.h.) (0.0457 m³/s) or 7.3% by volume. Furthermore, oxygen is added at a rate of 7000 s.c.f.h. (0.0520 m³/s) to the combustion chamber. Such conditions result in a primary combustion of 180% and a combustion chamber pressure of 5.1 inches (17.2 kPa) of mercury. The resultant stream of hot combustion gases flow into the transition zone where the coherent jets of liquid feedstock are injected thereinto from the periphery through four openings, each of 0.038 inch (0.97 mm) in size. The feedstock is preheated to 400° F. (204° C.) and is fed at a rate of 101 gph (0.117 kg/s) under a pressure of 216 p.s.i.g. (1.49 MPa). The residence time of the reaction is 0.7 second and the gas stream is quenched with water to a temperature of 1400° F. (760° C.). The overall percent combustion of the process is 48.1%. The black is collected normally and then pelletized and dried under oxidizing conditions of a sufficient nature as to yield a black having an iodine surface area of 740 m$_2$/g, a pH of 3.2, a DBP of 197 cc/100 g, and a tint strength of 132%. Further information appears in Table III.

EXAMPLE 7

The procedure and apparatus used herein are similar to that of Example 6 with certain exceptions. Combustion air, preheated to 710° F. (377° C.), is introduced into the combustion chamber at a rate of 71,100 s.c.f.h. (0.529 m³/s) containing mixed therewith water introduced at a rate of 35 gph (6140 s.c.f.h.) (0.0457 m³/s) which is 7.9% by volume based on the total volume of reactants utilized to prepare the primary combustion. The natural gas is fed into the first zone at a rate of 3340 s.c.f.h. (0.0248 m³/s) under a pressure of 10 p.s.i.g. (0.069 MPa). In this instance oxygen is also added into the combustion zone at a rate of 3500 s.c.f.h. (0.0260 m³/s). Under these conditions, there is obtained a primary combustion of 298.7% and the pressure of the combustion chamber is found to be 3.2 inches (10.8 kPa) of mercury. The liquid feedstock, preheated to 405° F. (207° C.), is then injected into the hot, high velocity stream of combustion gases, in the form of coherent jets or streams, through four (4) unobstructed openings each of which is 0.036 inch (0.91 mm) in size. The liquid feedstock is injected at a rate of 99 gph (0.115 kg/s) and under a pressure of 245 p.s.i.g. (1.69 MPa). The third stage, or reaction zone, is composed of a section having a length of 24 feet (7.31 m) and a diameter of 36 inches (0.91 m) followed by a section having a length of 9 feet (2.74 m) and a diameter of 27 inches (0.686 m). Following a reactor residence time of 1 second, the reaction is water-quenched to a temperature of 1400° F. (760° C.). The overall combustion of the process is 47.7%. The analytical and physical properties of this black are given in Table III.

EXAMPLE 8

Utilizing the procedure and apparatus of Example 6 with minor modifications, the following run is carried out. Combustion air, preheated to 705° F. (374° C.), is introduced into the first zone of the reaction apparatus at a rate of 71,000 s.c.f.h. (0.528 m³/s) containing entrained therein added water which is introduced at a rate of 35 gph (6140 s.c.f.h.) (0.0457 m³/s) or 7.7% by volume based on the gaseous volume of reactants employed in preparing the primary combustion. There are also fed into the combustion chamber natural gas at a rate of 5540 s.c.f.h. (0.0412 m³/s) under a pressure of 21 p.s.i.g. (0.145 MPa) and oxygen at a rate of 3500 s.c.f.h. (0.0260 m³/s). This results in a primary combustion of 179.6% and the pressure of the combustion chamber is measured as 4.1 inches (13.8 kPA) of mercury. The resultant gaseous stream enters the transition zone (9 inches (0.229 m) in length by 5.3 inches (0.134 m) in diameter) and the liquid feedstock, preheated to 405° F. (207° C.), is injected thereinto, as solid streams, through four (4) unobstructed orifices of 0.040 inch (1.02 mm) size, at a rate of 86 gph (0.100 kg/s) under a pressure of 140 p.s.i.g. (0.97 MPa) thereby obtaining proper penetration to assure good atomization and dispersion of the feedstock. The gaseous stream enters the reaction chamber which is formed of 2 sections, one having a length of 24 feet (7.32 m) by a diameter of 36 inches (0.91 m) and the subsequent having a length of 8 feet (2.44 m) and a diameter of 27 inches (0.686 m), therein, after a residence time of 1 second, the reaction is water-quenched to 1400° F. (760° C.). Thereafter, the black is collected and pelletized and dried under oxidizing conditions. The overall percent combustion of the process is 47.9%. Analytical and physical properties of this black are reported in Table III.

EXAMPLE 9

Essentially similar apparatus and procedure as used in Example 8 is employed herein except as follows. Combustion air, preheated to 750° F. (399° C.), is introduced into the combustion chamber at a rate of 70,700 s.c.f.h. (0.526 m³/s) containing added water injected thereinto at a rate of 20 gph (3510 s.c.f.h.) (0.0261 m³/s) which is determined to be 4.5% by volume of first stage reactants. The natural gas is injected into the first stage at a rate of 6700 s.c.f.h. (0.05 m³/s) under a pressure of 26 p.s.i.g. (0.179 MPa). Under such conditions, the primary combustion is 119.8% and the pressure in the combustion chamber is 3.6 inches (12.2 kPa) of mercury. The hot stream of gaseous combustion products then enters the transition zone where liquid feedstock, preheated to 330° F. (166° C.), is injected thereinto from the periphery under a pressure of 320 p.s.i.g. (2.20 MPa). The feedstock is injected through four (4) unobstructed openings each of which is 0.0225 inch (0.57 mm) in size at a rate of 44 gph (0.051 kg/s). Following a residence period of 1.0 second, the reactor is water-quenched to a temperature of 1400° F. (760° C.). The overall percent combustion of the process is 55.5%. The black is collected and subjected to pelletizing and drying under oxidizing conditions so as to yield a low pH product. The analytical and physical properties are reported in Table III.

EXAMPLE 10

The procedure and apparatus of Example 9 are followed except as noted. Combustion air, preheated to 710° F. (377° C.), is fed into the combustion chamber at a rate of 60,500 s.c.f.h. (0.450 m³/s) together with added water entrained therein at a rate of 31 gph (5440 s.c.f.h.) (0.0405 m³/s), or 8.3% by volume based on the total volume of the combustion air and natural gas used to produce the primary combustion. Natural gas is introduced into the first zone at a rate of 4910 s.c.f.h. (0.0365 m³/s) under a pressure of 17 p.s.i.g. (0.117 MPa). The primary combustion is determined to be 139.7% and the combustion chamber pressure is read as 2.7 inches (9.1 kPa) of mercury. The hot stream of gaseous products then passes into the transition zone equipped with four (4) unobstructed orifices around the periphery each of 0.025 inch (0.64 mm) in size. The liquid feedstock, preheated to 330° F. (166° C.) is injected into the gaseous stream through the four orifices at a rate of 41 gph (0.048 kg/s) under a pressure of 167 p.s.i.g. (1.15 MPa). The residence time of the reaction is 1.2 seconds prior to quenching with water to a temperature of 1400° F. The overall percent combustion is 55.9%. The black is collected, and pelletized and dried under oxidizing conditions such that a black of low pH is produced. The analytical and physical properties of the black are given in Table III.

EXAMPLE 11

Following closely the procedure of Example 10, combustion air, preheated to 735° F. (391° C.), is introduced into the combustion chamber at a rate of 70,100 s.c.f.h. (0.522 m³/s) containing therein added water introduced at a rate of 46 gph (8070 s.c.f.h.) (0.060 m³/s) which corresponds to 10.5% by volume based on the total volume of air and gas used to produce the primary combustion.

TABLE III

| Black Sample | Ex. 6 | Ex. 7 | Ex. 8 | Ex. 9 | Ex. 10 | Ex. 11 | Control+ |
|---|---|---|---|---|---|---|---|
| Iodine Surface Area, m²/g | 740 | 630 | 772 | 865 | 934 | 1029 | 678 |
| pH | 3.2 | 3.6 | 3.4 | 3.0 | 3.3 | 4.0 | 9.1 |
| DBP, cc/100g | 197 | 196 | 225 | 241 | 264 | 274 | 313 |
| Tint Strength, % | 132 | 121 | 138 | 134 | 142 | 148 | 125 |
| Ethylene/ethyl Acrylate Resin Containing 12% Loading Carbon Black (by weight) | | | | | | | |
| Volume Resistivity, Room Temp., ohm-cm | — | 101 | 49 | 30 | 22 | 18 | 13.7 |
| Volume Resistivity, 90° C., ohm-cm | — | 131 | 57 | 29 | 22 | 17 | 21 |
| Compound Moisture Absorption, % | — | 0.56 | 0.58 | 0.89 | 0.44 | 0.38 | 0.37 |

+The control is a highly conductive carbon black obtained as a by-product in gasification processes utilized for the preparation of carbon monoxide and hydrogen-containing gas mixtures involving the gasification of hydrocarbons with oxygen-containing gases at high temperatures.

The natural gas is introduced into the first zone at a rate of 6750 s.c.f.h. (0.050 m³/s) under a pressure of 18 p.s.i.g. (0.124 MPa). As a result, there is produced a primary combustion of 119.9% and a combustion chamber pressure of 3.1 inches (10.4 kPa) of mercury. The resultant hot stream of water-laden combustion gases enters the transition zone where liquid feedstock, preheated to 310° F. (154° C.), is injected thereinto through four (4) unobstructed orifices of 0.0225 inch (0.57 mm) size peripherally. The feedstock is fed at a rate of 41 gph (0.048 kg/s) and under a pressure of 170 p.s.i.g. (1.17 MPa) thereby assuring proper penetration of the combustion gas stream. The residence time in the reactor is 1.0 second followed by waterquenching of the reaction to a temperature of 1345° F. (729° C.). The overall percent combustion of the process is 57%. The black is collected, pelletized and dried under oxidizing conditions. Further details of the black of this example appear in Table III.

From the above data it is apparent that the process of the present invention results in the preparation of furnace blacks having exceptionally high surface areas. Moreover, the data indicate that the conductivity properties of the furnace process blacks of this invention are reasonably comparable to that of the highly conductive gasification process by-product blacks.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a modular process for producing furnace carbon blacks having higher than normal surface areas wherein a fuel and an oxidant are reacted in a first zone so as to provide a stream of hot primary combustion gases possessing sufficient energy to convert a carbon black-yielding liquid hydrocarbon feedstock to carbon black, and wherein in a second zone the liquid hydrocarbon feedstock is peripherally injected, in the form of a plurality of coherent jets, into the stream of gaseous combustion products in a direction substantially transverse to the direction of flow of the stream of combustion gases and under sufficient pressure to achieve the degree of penetration required for proper shearing and mixing of the feedstock, and wherein in a third zone the feedstock is decomposed and converted into carbon black prior to termination of the carbon forming reaction by quenching, and then cooling, separating and recovering the resultant carbon black, the improvement which comprises introducing water, in the form of vapor, in an amount of from about 4 to 15% by volume based on the total gaseous volume of the fuel and oxidant utilized in preparing the primary combustion, into the first zone such that the water vapor is well mixed with the stream of gaseous combution products prior to the introduction of the liquid feedstock, and maintaining the carbon black forming reaction in the third zone for a residence time of at least 0.5 seconds, and operating the process under conditions such that the overall percent combustion thereof ranges from about 40 to about 60 percent.

2. A process as defined in claim 1 wherein the amount of water, in the form of water vapor, ranges from about 4.6 to about 11% by volume.

3. A process as defined in claim 1 wherein the amount of water, in the form of water vapor, ranges from about 9 to about 11% by volume.

4. A process as defined in claim 1 wherein the added water is introduced together with the oxidant.

5. A process as defined in claim 1 wherein the residence time is at least 1.0 second.

6. A process as defined in claim 1 wherein the overall percent combustion ranges from about 46 to about 57 percent.

* * * * *